(12) United States Patent
Dubhashi et al.

(10) Patent No.: US 8,161,544 B2
(45) Date of Patent: Apr. 17, 2012

(54) TRUSTED COMMUNICATIONS WITH CHILD PROCESSES

(75) Inventors: Kedarnath Atmaram Dubhashi, Redmond, WA (US); Jonathan D. Schwartz, Kirkland, WA (US); Sambavi Muthukrishnan, Woodinville, WA (US); Simon Skaria, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1550 days.

(21) Appl. No.: 11/488,979

(22) Filed: Jul. 19, 2006

(65) Prior Publication Data

US 2008/0022281 A1  Jan. 24, 2008

(51) Int. Cl.
*G06F 21/00* (2006.01)
(52) U.S. Cl. ............... 726/17; 726/22; 726/23; 713/164; 713/167
(58) Field of Classification Search ............ 726/17, 726/18, 20, 22–24; 713/164, 167, 187; 718/106
See application file for complete search history.

(56) References Cited

U.S. PATENT DOCUMENTS

| | | | |
|---|---|---|---|
| 6,304,974 B1 | 10/2001 | Samar | 713/201 |
| 6,650,342 B1 | 11/2003 | Lim | 345/736 |
| 6,964,047 B2 | 11/2005 | Fenchel | 718/102 |
| 2002/0087916 A1 | 7/2002 | Meth | 714/16 |
| 2004/0254909 A1* | 12/2004 | Testa | 707/1 |
| 2005/0149944 A1 | 7/2005 | Morrison et al. | 719/310 |
| 2005/0177835 A1 | 8/2005 | Chickering | 719/310 |
| 2005/0240641 A1 | 10/2005 | Kimura et al. | 707/206 |
| 2006/0089967 A1* | 4/2006 | Gutmans et al. | 709/203 |
| 2007/0186044 A1* | 8/2007 | Fowles | 711/130 |
| 2007/0198851 A1* | 8/2007 | Goto | 713/187 |

FOREIGN PATENT DOCUMENTS

| | | |
|---|---|---|
| GB | 2 408 361 | 5/2005 |
| WO | WO 2006/026124 A2 | 3/2006 |

OTHER PUBLICATIONS

Edwards, A. et al., "Experiences Implementing a High Performance TCP in User-Space", *Association for Computing Machinery*, 1995, http://www.csie.nctu.edu.tw, 10 pages.
Edwards, N. et al., "A Secure Linux Platform", *Proceedings of the 5th Annual Linux Showcase & Conference*, Nov. 5-10, 2001, 19 pages, http://www.linuxshowcase.org.
Kang, M.H. et al., "Design Documentation for the SINTRA Global Scheduler", http://chacs.nrl.navy.mil/publications, 22 pages.

* cited by examiner

*Primary Examiner* — Taghi Arani
*Assistant Examiner* — Justin T Darrow
(74) *Attorney, Agent, or Firm* — Woodcock Washburn LLP

(57) ABSTRACT

A method to identify a child process to a parent process in an operating system includes obtaining a token and login identifier from the operating system. The parent process creates a remote procedure call communications endpoint to communicate with the child process. Thereafter, a child process is spawned by the parent process. A child-initiated request to communicate with the parent process is then received by the parent process. In order to verify the identity of the child-initiated request, the parent process impersonates the child process and receives as identifier that identifies the requestor child process. The requestor process identifier and the spawned child identifier are compared. Based on the comparison, the parent process responds to the child-initiated request. In another embodiment, process identifiers are used by the parent process to verify the identity of a child process the requests communication with the parent process.

20 Claims, 7 Drawing Sheets

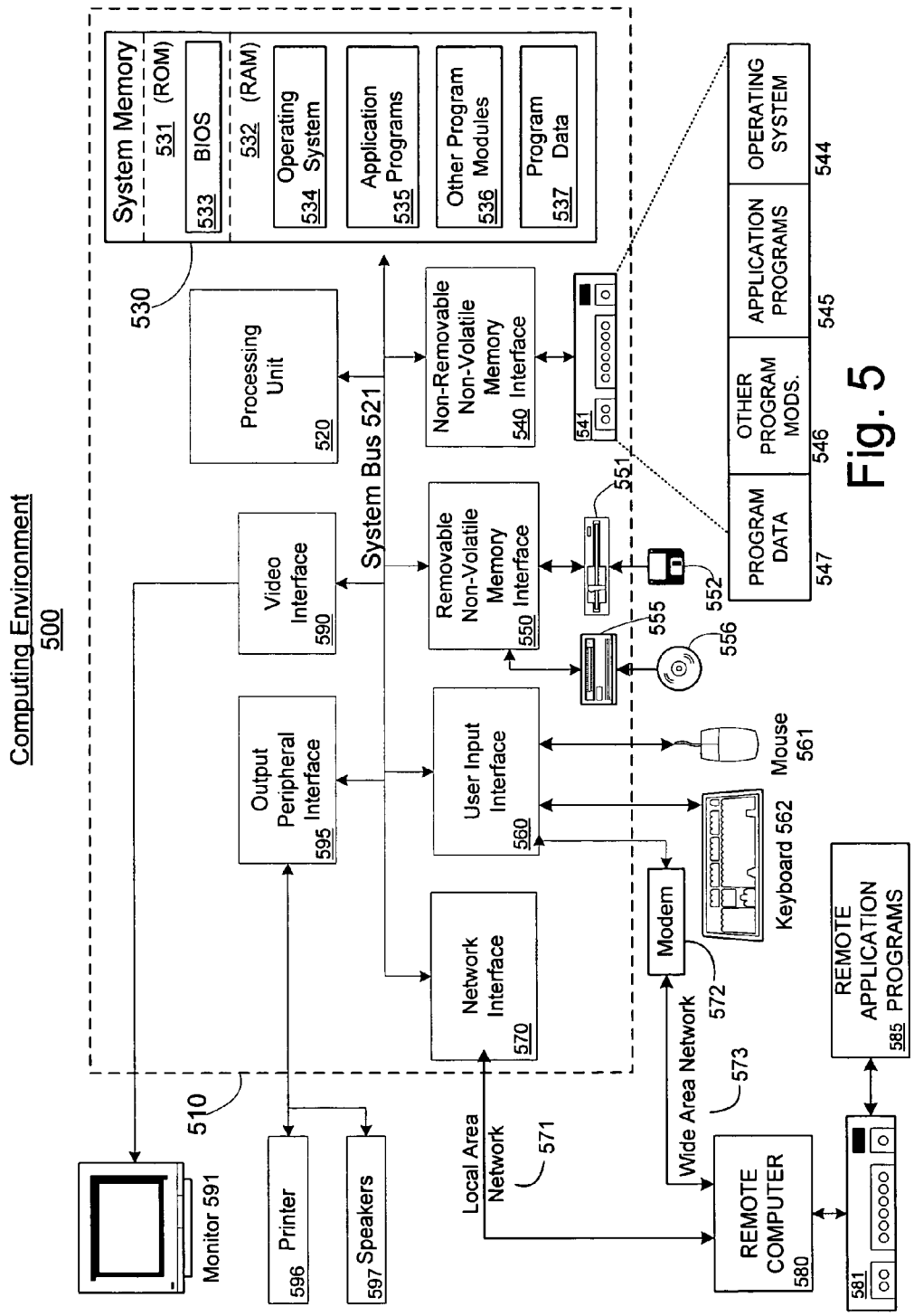

TRUSTED COMMUNICATIONS WITH CHILD PROCESSES

FIELD OF THE INVENTION

This invention relates, in general, to the field of operating systems, and more specifically, to a method for identifying a legitimate child process by a parent process in an operating system.

BACKGROUND

A software application within a computer's operating system typically performs a set of well-defined tasks. During the execution of the software application, the computer's operating system may create one or more new 'processes'. Sometimes, a new process is a sub-program. Hence, it is not surprising that during the execution of a process (e.g. a software application), the operating system may create a set of new sub-processes, which in turn, may require the creation of their own sub-processes, and so on, until the entire process is completed executed.

If an operating system creates a sub-process while executing a given process, then this sub-process is called the 'child process' of the given process, which in turn is called the 'parent process'. In particular, when a child process is created, it can communicate with its parent process through an allotted communication channel, to send and receive information regarding the tasks that need to be performed.

Since the above mentioned phenomenon of creating sub-processes is fairly common among most, if not all, of the operating systems, certain computer viruses, denial of service attacks and other malicious systems often try to create malicious processes. These malicious processes can then claim to be the child processes of a legitimate parent process that executes as a part of the software application. Furthermore, they can start sending incorrect results to their parent processes, their sibling processes and even their child processes. These malicious processes may also perform undesired tasks, thereby degrading the efficiency of the operating system and other systems within the computer system. It is clear that although malicious processes are more likely to claim themselves as a legitimate child process of a 'true' parent process, the above mentioned phenomenon can even occur with 'new processes' that have gone awry. In some instances, a sub-process may claim to be the child process of one parent process when they are actually the child processes of another.

It would be beneficial if a method existed that can identify a legitimate child process with respect to its parent process before the child process can communicate with the parent process before the parent process relies on the requesting child process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One method to identify a child process to a parent process on an operating system involves the use of impersonation of a child process. In this method, the parent process uses the Application Program Interface (API) of an operating system to initiate a logon session. The API returns a token that can identify security information of the logon session back to the parent process. The parent process creates a Remote Procedure Call (RPC) communications endpoint and establishes a server that can respond to communication requests. Thereafter, a child process is spawned by the parent process. During spawning, the parent process keeps a track of a logon identifier of the child process. Further, the parent process sets a security descriptor on the child process. The parent process waits for a termination notification from the API of the operating system, which indicates the termination of the child process. On receiving the termination notification, the parent process refuses communication with the child process and closes the RPC communications endpoint. If no termination notification is received, the parent process may receive a requestor-initiated request. In order to verify the identity of the requestor, the parent process impersonates it. In response, the operating system provides the security logon identifier that identifies the requestor process. The parent process then compares the requesting logon identifier with the spawned child logon identifier. In case the comparison of the requesting security identifier and the spawned child security identifier is a match, the parent process responds to the child-initiated request. If it is not a match, the parent process refuses the request.

In another embodiment, a method to identify a child process to a parent process on an operating system in computer software involves the use of a process identifier. The parent process uses the API of an operating system to initiate a logon session. The API returns a token that can identify security information of the logon session back to the parent process. The parent process then creates an RPC communications endpoint and establishes a parent server that can respond to communication requests. Thereafter, a child process is spawned by the parent process. During spawning, the parent process passes the RPC communications endpoint as a command-line parameter. A child process identifier of the child process is generated by the OS during spawning. The parent process keeps a track of the child process identifier. Thereafter, the parent process sets a security descriptor on the child process. Further, the parent process waits for a child process termination notification from the API of the operating system, which indicates the termination of a child process. On receiving the child process termination notification, the parent process refuses communication with the child process and closes the RPC communications endpoint. While waiting for the child process termination notification, the parent process may receive a child-initiated request for communication. The requestor-initiated request includes a requesting process identifier. In order to verify the identity of the requestor, the parent process queries the operating system for a spawned child process identifier. On receiving the spawned child process identifier from the operating system, the parent process compares the requestor process identifier with the spawned child process identifier. In case the comparison of the requestor identifier and the spawned child process identifier is a match, the parent process responds to the child-initiated request. If it is not a match, the parent process refuses the child-initiated request and closes the RPC communications endpoint.

BRIEF DESCRIPTION OF THE DRAWINGS

In the drawings:

FIG. 5 is a block diagram showing an exemplary host computing environment.

DETAILED DESCRIPTION

Exemplary Embodiments

Figure 1:
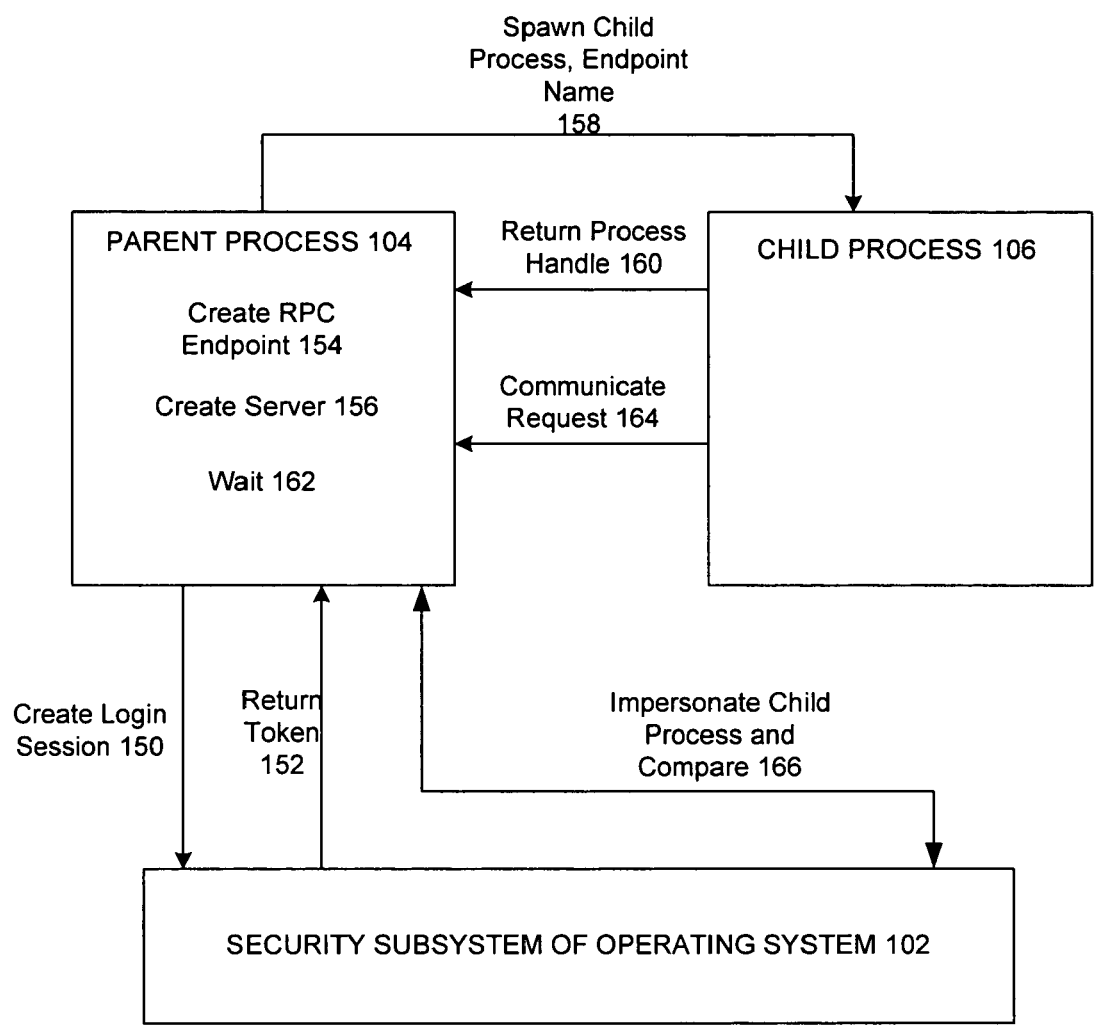
FIG. 1 is a block diagram that uses impersonation to verify the identity of a child process.

FIG. 1 is a block diagram 100 that uses Application Program Interfaces (APIs) of an operating system to identify a legitimate child process using impersonation. For example, the exemplary API can be the API available on MICROSOFT®'s Windows® XP Operating System and its variants. Block diagram 100 includes a security subsystem 102, a parent process 104, and a child process 106. Security subsystem 102 is programmed to authenticate users and render services to users on a computer system. Parent process 104 communicates with security subsystem 102 to authenticate a user. Parent process uses an operating system provided API to log onto the identity under whose security context the child process is to be spawned. The login session is created 150 and the security subsystem returns a login token 152. The token is to be supplied when the creating the child process to ensure the child process is created to run as the user.

The parent process creates a remote procedure call (RPC) endpoint 154 as the communication channel with the child process. The parent process 104 creates a server 156 to respond to requests on the communications endpoint. The parent process spawns 158 a child process passing the endpoint name as a command line parameter, and keeps track of the login security identifier (Logon SID) of the child process which can be determined from the earlier acquired token. A Logon SID is a security identifier (SID) that identifies a logon session. A logon SID is valid until the user logs off and is unique while the computer is running; no other logon session will have the same logon SID. The logon SID can be retrieved from a token using operating system provided APIs.

The parent process also sets a security descriptor on the child process such that only the Local System and Administrators have any access to the child process. This may include setting the owner to Local System and setting the Discretionary Access Control List (DACL) to allow Admin/Local System access. This action prevents any other process running with the same identity as the child process from controlling the child process.

The OS returns a process notification 160 after spawning. On receiving a special purpose termination process notification, the parent process refuses communication with any process and closes the RPC communications endpoint. The termination notification API returns only if the child process terminates or is terminated. Anytime the process terminates, the parent process refuses all communication requests, closes the endpoint and starts over if a new child process is needed. Otherwise the parent process continues and waits for a child process request.

The parent process waits 162 for the child process to communicate a request for service of the parent process. The parent process waits 162 for this request in a separate thread. An operating system supplied API is used for this purpose. The child process makes a communication request 164 for receiving/sending data on the parent process by communicating with the supplied endpoint.

At this point, the parent process does not know the identity of the process connecting to it. To verify that this is indeed the process it spawned, it impersonates the client process. Impersonation is the ability of a thread in a process to execute in a security context that may be different from the security context of the process in which the thread runs. This security context corresponds to some identity on the system. When running in this identity's security context, the thread "is" that identity. The thread uses an access token representing the identity's credentials to obtain access to the securable objects to which the identity has access and no more. Once the child process is impersonated 166, the parent process can determine the Logon SID of the child process from the current thread token. Only if this Logon SID matches the Logon SID determined earlier, does the parent process respond positively to the communication request made by the child. Otherwise, the child is not properly identified by the parent process, and the parent process closes the endpoint.

In one embodiment, every communication request received by the parent process on the communication channel from the child process is impersonated and compared to confirm the identity of the requesting child process. It is notable that since the Logon SBD is guaranteed to be unique for every unique logon session until the machine is restarted, there can be no other process on the machine which can have the same Logon SID. This guarantees that a malicious process can not masquerade as the child process. This mechanism assumes that the child process does not give its token away to a malicious process.

Figure 2A:
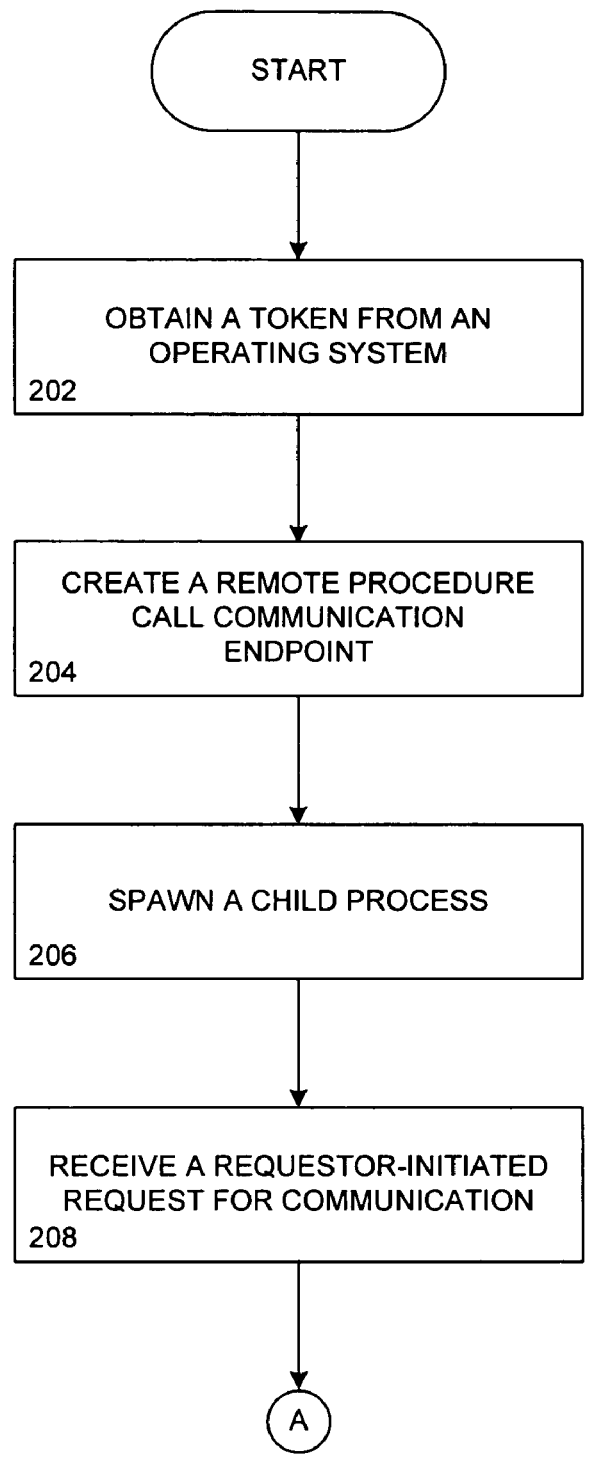
FIGS. 2a and 2b are flow diagrams of a method to identify a child process using impersonation.
Figure 2B:
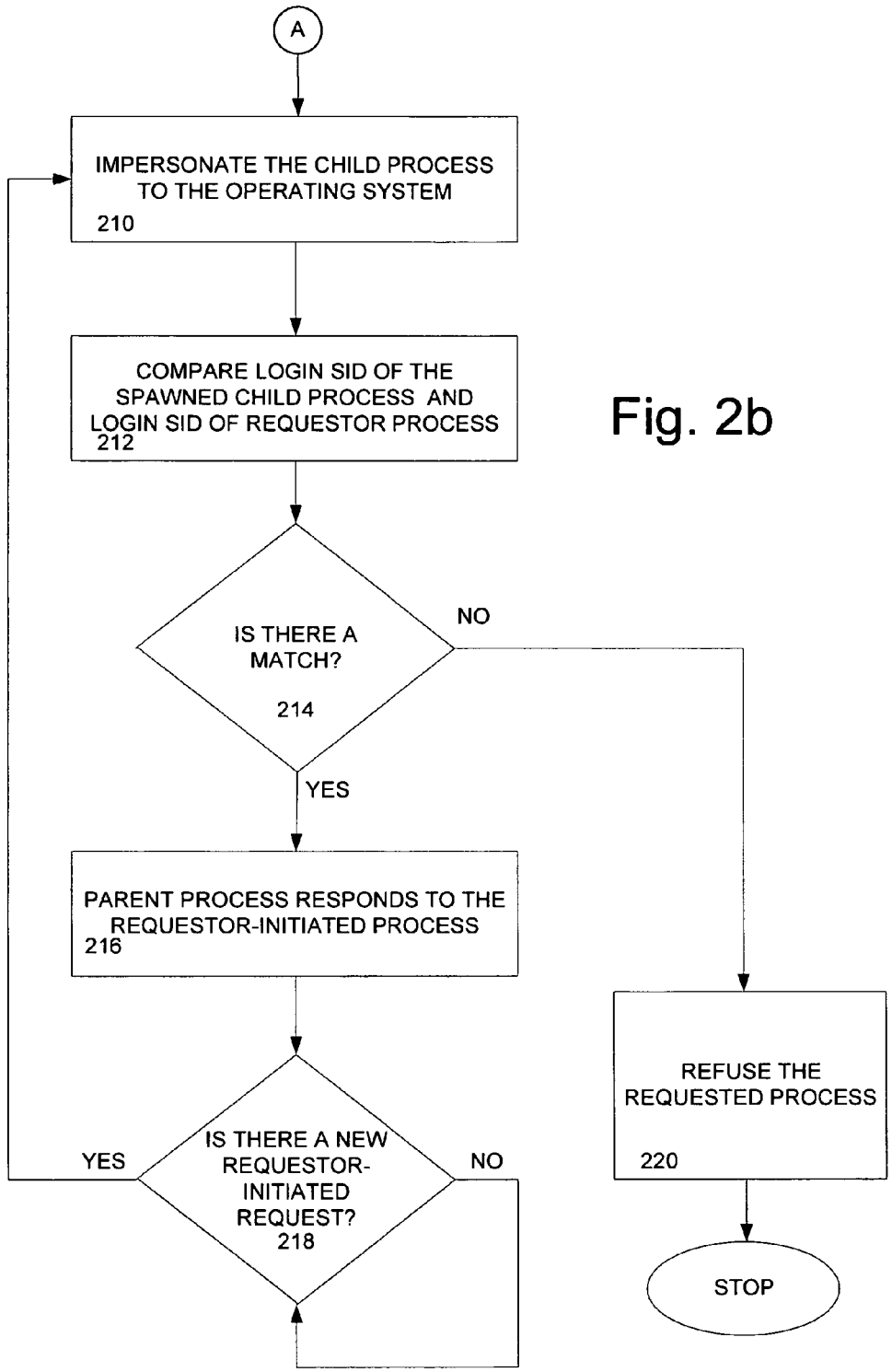

FIGS. 2a and 2b illustrates a flow diagram 200 of a method to identify child process 106 to parent process 104 in an operating system using impersonation. Impersonation is the ability of a thread in the parent process to execute under the same security information as that of its parent process. In one embodiment, the method described in the flow diagram in FIGS. 2a and 2b can be performed by the API available on MICROSOFT®'s Windows® XP Operating System and its variants, such as NT 3.1. The flow diagram in FIGS. 2a and 2b is described with respect to the block diagram 100 in FIG. 1. At step 202, a token that includes a logon identifier is obtained by parent process 104 from the security subsystem 102 of the operating system. The token is obtained by parent process 104 during a user logon session under whose security context a child process will be spawned. The logon identifier included in the token, identifies the logon session. At step 204, parent process 104 creates a Remote Procedure Call (RPC) communications endpoint, and establishes a parent server for process responses. The RPC communications endpoint is a network-specific address that can be used by a process to communicate with other processes on the same or different computer systems in a network. Further, the process responses can be communicated between parent process 104 and child processes for a certain task.

At step 206, parent process 104 spawns child process 106 and passes the RPC communications endpoint to child process 106. Child process 106 may be spawned with a limited access. Alternatively, child process 106 may be spawned with the same access control as that of parent process 104. During the spawning, parent process 104 keeps track of the logon SID of child process 106. In one embodiment, only a parent process identity can access the spawned child process. Child process 106 can communicate with parent process 104 to retrieve or send additional information on the tasks that are being executed by the child process 106. To communicate with parent process 104, child process 106 sends a request to parent process 104. This child-initiated request is received by parent process 104, at step 208. The child-initiated request includes a requesting child logon SID. The requesting child logon SID is included for identifying child process 106 as a legitimate child process.

At step 210, parent process 104 impersonates child process 106 to the operating system, in order to verify whether the child-initiated request for communication is from a legitimate child process of parent process 104. When parent process 104 impersonates child process 106, a thread containing an impersonation token is created. The impersonation token contains the security information of the logon session initiated by parent process 104. Using the impersonation token generated during the impersonation process, parent process 104, with the help of the operating system, can identify a spawned child logon SID.

At step 212, parent process 104 compares the requesting child login SID with the spawned child logon SID. If the comparison of the security identifiers is a match at step 214, parent process 104 responds to the child-initiated request, at step 216. If subsequent child-initiated process are generated at step 218, then step 210-214 are repeated. If the security identifiers do not match, parent process 104 refuses the child-initiated request to communicate at step 220.

Figure 3:
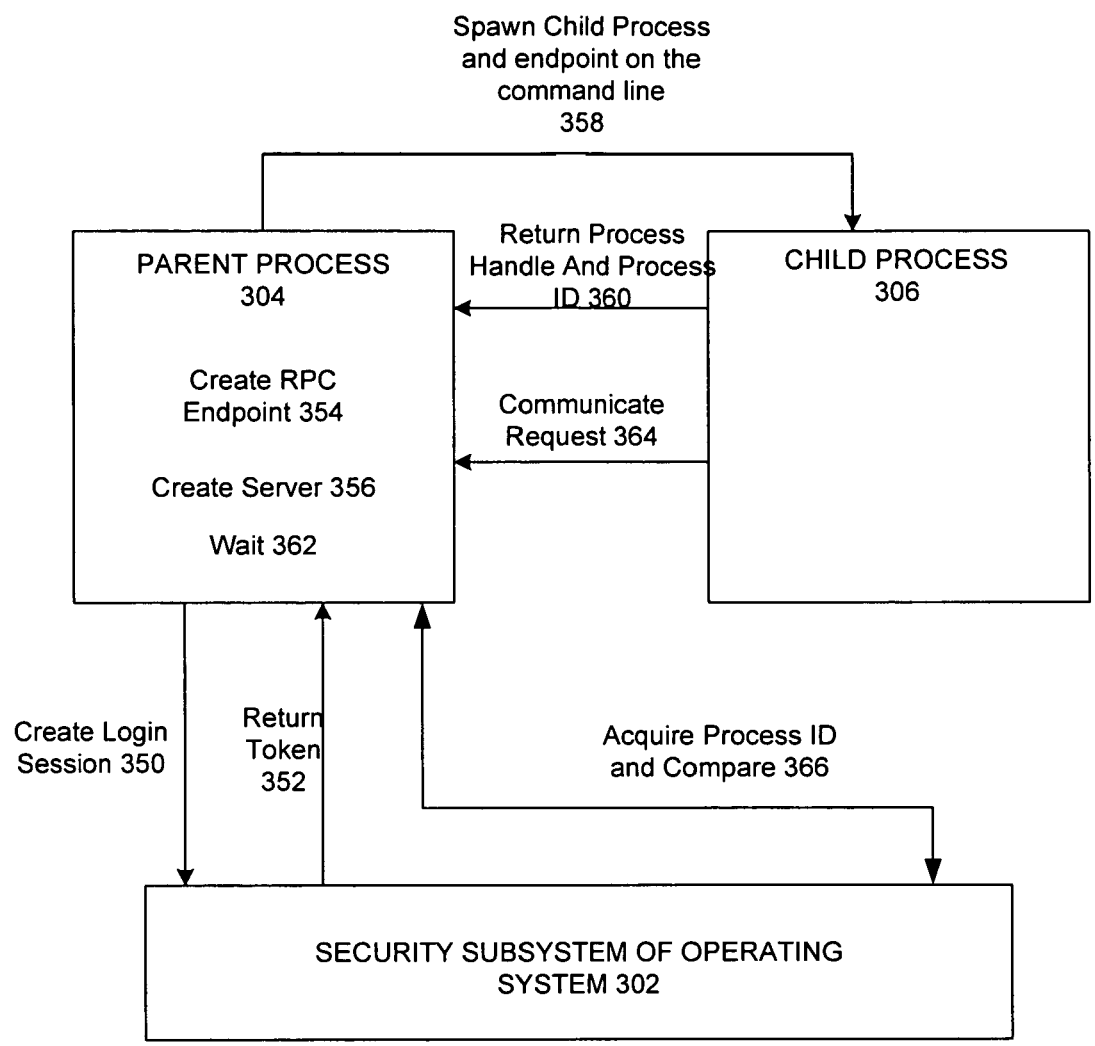
FIG. 3 is a block diagram that uses a process identifier to verify the identity of a child process.

FIG. 3 is a block diagram 300 that uses Application Program Interfaces (APIs) of an operating system to identify a legitimate child process using a process identifier. For example, the exemplary API can be the API available on MICROSOFT®'s Windows® Operating System and its variants. Block diagram 300 includes a security subsystem 302, a parent process 304, and a child process 306. Security subsystem 302 is programmed to authenticate users and render services to users on a computer system. Parent process 304 communicates with security subsystem 302 to authenticate a user. Parent process uses an operating system provided API to logon the identity under whose security context the child process is to be spawned. The login session is created 350 and the security subsystem returns a login token 352. The token is to be supplied when the creating the child process to ensure the child process is created to run as that identity.

The parent process creates the a remote procedure call (RPC) endpoint 354 as the communication channel with the child process. The parent process 304 creates a server 356 to respond to requests on the communications endpoint. The parent process 304 may spawn child process and pass the token to the spawned child process 358. The parent process also keeps track of the child process identifier that is returned when the child process is spawned. The child process identifier is a value that can be used to identify a process. The value is valid from the time the process is created until the time the process is terminated.

The parent process 304 then waits 362 for the child process 306 to request service of the parent process. Child process communicates a request for service 364 with parent process through the RPC communication channel.

The parent process spawns a child process passing the endpoint name as a command line parameter 358, and keeps track of the child process identifier returned when spawning it. The parent process sets a security descriptor on the child process such that-only the local system and administrators have any access to the child process. This may include setting the owner to Local System and setting the DACL to allow the Administrator or Local System access. This prevents any other process running with the same identity as the child process from controlling the child process.

The child process may return a special purpose termination process notification 360 after spawning. An operating system supplied API may be used for this purpose. The API returns only if the child process terminates or is terminated. Anytime the process terminates, the parent process refuses all communication requests, closes the endpoint and starts over if a new child process is needed.

The parent process waits 362 for the child process to communicate a request for service of the parent process. The parent process waits 362 for this request in a separate thread. The child process makes a communication request 364 for receiving./sending data on the parent process by communicating with the supplied endpoint.

At this point, the parent process does not know the identity of the process connecting to it. To verify that this is indeed the process it spawned, the parent queries for the child process identifier from the communications channel. In one embodiment, this is available on Windows® XP and up. Only if the requesting child process identifier matches the process identifier for the process the parent process spawned, does the parent process respond positively to the communication request. Otherwise, the child is not properly identified by the parent process, and the parent process closes the endpoint.

In one embodiment, every communication request received by the parent process on the communication channel from the child process has an child process identifier which is compared to a known spawned-child process identifier to confirm the identity of the requesting child process. Since process identifiers can be recycled by the operating system, there is a possibility that the child process is killed and a malicious process gets itself created with the same process identifier. To prevent this, the parent process can identify if the child process was ever terminated. If it was terminated, the child process request for parent process service is ignored.

Figure 4A:
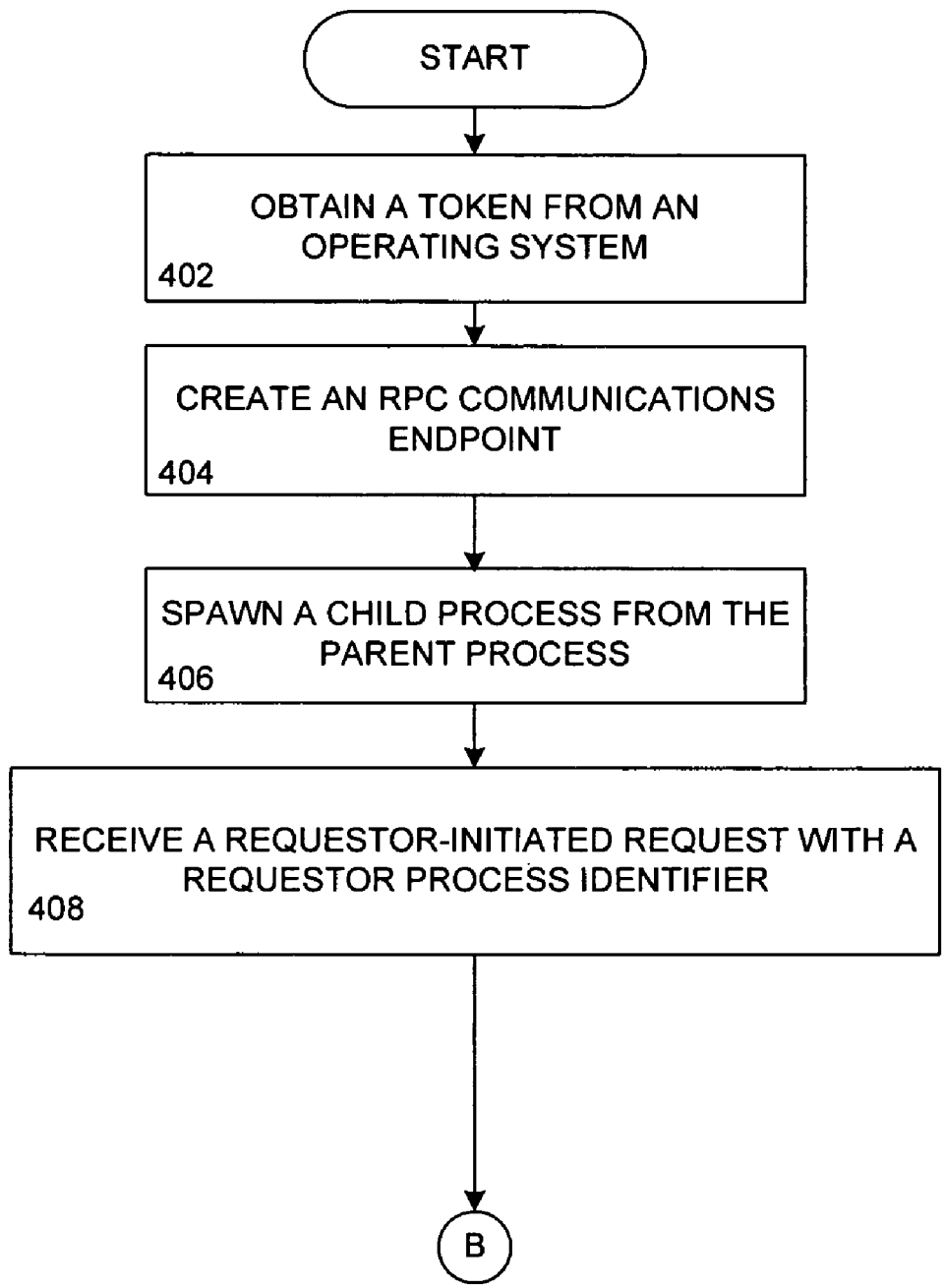
FIGS. 4a and 4b are flow diagrams of a method to identify a child process using a process identifier.
Figure 4B:
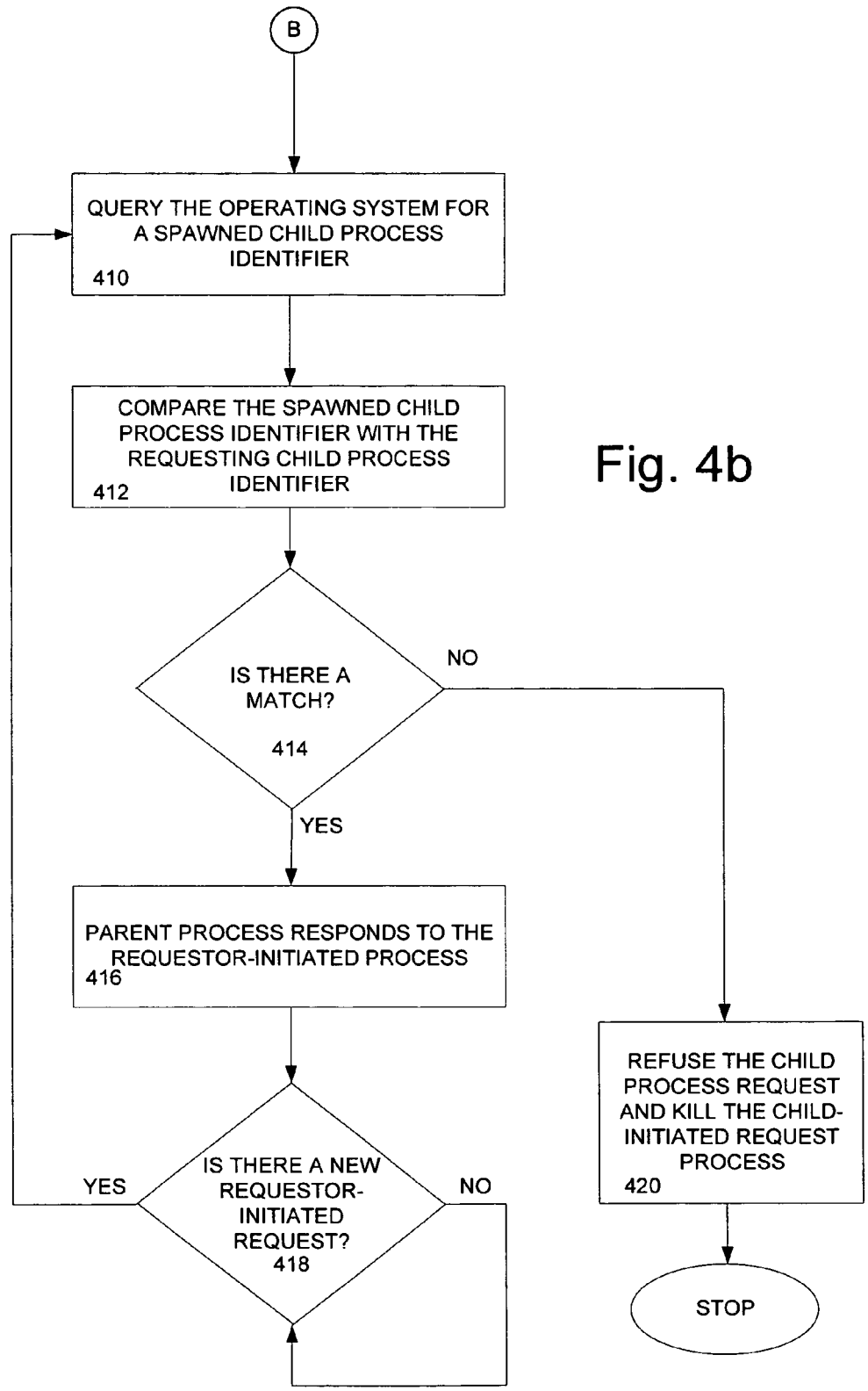

FIGS. 4a and 4b are flow diagrams of a method 500 to identify child process 306 to parent process 304 in the operating system, using a unique identifier of a child process. Flow diagram method 400 in FIGS. 4a and 4b is described with respect to block diagram 300 in FIG. 3. At step 402, a token that includes a logon identifier is obtained by parent process 304 from security subsystem 302 of the operating system during a logon session. This token is an object that contains security information of parent process 304. The logon identifier included in the token identifies the logon session. At step 404, parent process 304 creates a Remote Procedure Call (RPC) communications endpoint. The RPC communications endpoint is a network-specific address that can be used by a process to communicate with other processes on the same or different computer systems in a network. Further, the process responses can be used for communication between parent process 304 and its child processes for a certain task. Further, parent process 304 establishes a parent server capable of responding to communication requests from child processes. The communication requests arriving at the RPC communications endpoint created by parent process 304 are recognizable by the parent server.

At step 406, parent process 304 spawns child process 306 and passes the RPC communications endpoint to child process 306. Child process 306 may be spawned under the same security information as parent process 304. Alternatively, child process 306 may be created under different security information as compared to parent process 304. During the spawning of child process 306, a child process identifier is generated. The child process identifier is a unique identifier that can be used to identify child process 306. The child process identifier is then transmitted by security subsystem 302 of the operating system to parent process 304. The parent process 304 then keeps a track of the child process identifier. For example, in MICROSOFT®'s Windows® Operating System and its variants, an API returns the child process identifier of child process 306 to parent process 304. The child process identifier can uniquely identify child process 306, while the computer system executes processes in the operating system i.e., no other process should have the same child process identifier. Moreover, the child process identifier is valid from the time child process 306 is created to the time child process 306 is terminated.

During the spawning of child process 306, parent process 304 passes the RPC communications endpoint as one of the command-line parameters to child process 306. Child process 306 can then communicate with parent process 304 by using the RPC communications endpoint. Once child process 306 is spawned, parent process 304 sets a security descriptor on child process 306. The security descriptor contains information pertaining to access rights provided to other processes for accessing a child process 306.

Further, during the operation of an application, a parent process might receive a process termination notification from the operating system. It informs a parent process that its child process has been terminated. Parent process 304 then checks if the child process notification has been returned by the operating system. If parent process 304 receives the child process notification in a separate thread from the operating system, parent process 304 refuses all communication requests from child process 306. Thereafter, parent process 104 closes the RPC communications endpoint for child process 306.

While parent process 304 waits for the child process termination notification from the operating system, parent process 304 receives a child-initiated request from child process 306, at step 408. In one embodiment, the child-initiated communications request may include, for example, a request for sending or receiving data from parent process 304. Child process 306 addresses the child-initiated request to the RPC communications endpoint. Along with the child-initiated request, child process 306 also transmits the child process identifier to parent process 304. In a more secure environment, the parent process (304) gets the child's process identifier from the operating system, since the child process itself isn't necessarily trustworthy. The child process identifier is referred to as a requesting child process identifier. At the instance of receiving the child-initiated request, parent process 304 may not recognize the identity of the child process that transmitted the child-initiated request and hence does not respond to the child-initiated request immediately. To verify that the child-initiated request is from an existing child process of parent process 304, the parent process 304 checks if the requesting child process identifier and the child process identifier of the child process 306 are the same. As a result, at step 410, parent process 304 queries the operating system for a spawned child process identifier. The operating system then provides the spawned child process identifier to parent process 304.

At step 412, parent process 304 compares the requesting child process identifier with the spawned child process identifier. If the requesting process identifier and the spawned child process identifier match at step 414, then the parent process 304 acknowledges that the process corresponding to the initiated request is a legitimate child process 306. Thereafter, parent process 304 responds to the child-initiated request from child process 306, at step 416. Further, for every new child-initiated request at step 418, parent process 304 repeats the steps of querying, comparing and responding, as described in the preceding paragraphs and steps 410-414. If the requesting child process identifier and the spawned child process identifier do not match at step 414, then parent process 304 closes the RPC communications endpoint.

Exemplary Computing Device

FIG. 5 and the following discussion are intended to provide a brief general description of host computer suitable for interfacing with the media storage device. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 5, an exemplary system for implementing an example host computer includes a general purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures.

Computer system 510 typically includes a variety of computer readable media. Computer readable media can be any available media that can be accessed by computer system 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 510.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 533, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer system 510. In FIG. 5, for example, hard disk drive 541 is illustrated as storing operating system 544, application programs 545, other program modules 546, and program data 547. Note that these components can either be the same as or different from operating system 544, application programs 545, other program modules 546, and program data 547. Operating system 544, application programs 545, other program modules 546, and program data 547 are given different numbers here to illustrate that, at a minimum, they are different copies.

A user may enter commands and information into the computer system 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

As mentioned above, while exemplary embodiments of the invention have been described in connection with various computing devices and network architectures, the underlying concepts may be applied to any computing device or system in which it is desirable to implement a method for identifying child processes in an operating system. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method to identify a child process to a parent process on an operating system in computer software using impersonation of a requestor process, the method comprising:

obtaining a token from the operating system, the token obtained by the parent process;

creating a communications endpoint by the parent process and establishing a parent server for processing requests;

spawning, by the parent process, a child process and passing the endpoint to the child process wherein access to the child process is limited, the child process having a child security identifier;

receiving a requestor-initiated request to communicate with the parent process, the request including a security identifier for a requestor process;

impersonating the requestor process by the parent process, the operating system providing a security identifier that identifies the requestor process to the parent process;

comparing the requestor process security identifier with the child security identifier, thereby identifying the requestor process as a child process spawned by the parent process; and responding, by the parent process, to the requestor-initiated request if the comparison is a match of security identifiers.

2. The method of claim 1, wherein obtaining a token from the operating system comprises:

calling into a security subsystem of the operating system by the parent process and receiving a token containing a logon identifier.

3. The method of claim 1, wherein creating a communications endpoint comprises creating a remote procedure call (RPC) communications endpoint.

4. The method of claim 1, wherein spawning further comprises:

setting, by the parent process, a discretionary access control list that identifies processes allowed to access the child process.

5. The method of claim 4, wherein only a parent process identity is permitted access to the child process.

6. The method of claim 1, further comprising:

receiving, by the parent process, a notification returned by the Operating System identifying a termination of child process; and refusing communications requests once the child process terminates.

7. The method of claim 6, wherein the termination notification is returned in a separate thread and the endpoint is closed by the parent process.

8. The method of claim 1, wherein receiving a requestor-initiated request comprises receiving by the parent process a requestor-initiated request for sending and receiving data.

9. The method of claim 1, wherein impersonating the requestor process to the operating system comprises using an application programming interface invoked by the parent process upon the operating system.

10. The method of claim 1, further comprising:

closing the endpoint, by the parent process, if the comparison of security identifiers is not a match.

11. The method of claim 1, further comprising:

repeating the steps of impersonating, comparing, and responding to every new request to communicate with the parent process.

12. A method to identify a child process to a parent process in an operating system in computer software using a process identifier, the method comprising:

obtaining a token from the operating system, the token obtained by the parent process;

creating a communications endpoint by the parent process and establishing a parent server for process responses;

spawning, by the parent process, a child process and passing the endpoint to the child process wherein access to the child process is limited, the spawning also producing a child process identifier;

receiving a requestor-initiated request to communicate with the parent process, the request made to the endpoint and including a requestor process identifier;

querying the operating system, by the parent process, for a spawned child process identifier, the operating system providing the spawned child process identifier;

comparing the requestor-initiated process identifier with the spawned child process identifier; thereby identifying a requesting process as the child process spawned by the parent process; and responding, by the parent process, to the requestor-initiated request if the comparison is a match of process identifiers.

13. The method of claim 12, wherein obtaining a token from the operating system comprises:

calling into a security subsystem of the operating system by the parent process and receiving a token containing a logon identifier.

14. The method of claim 12, wherein creating a communications endpoint comprises creating a remote procedure call (RPC) communications endpoint.

15. The method of claim 12, further comprising:

receiving, by the parent process, a notification returned by the child process identifying a terminated child process; and refusing communications requests with the terminated child process.

16. The method of claim 12, wherein receiving a requestor-initiated communications request comprises receiving by the parent process a requestor-initiated request for sending and receiving data.

17. The method of claim 12, further comprising:

closing the endpoint, by the parent process, if the comparison of process identifiers is not a match.

18. The method of claim 12, wherein if the parent process receives a child process notification corresponding to the child process, the notification received in a separate thread, then the child process is terminated and the parent process subsequently refuses all communication requests from the child process and closes the endpoint.

19. The method of claim 12, further comprising:

repeating the steps of querying, comparing, and responding to every new requestor-initiated request to communicate with the parent process.

20. The method of claim 12, further comprising setting a security descriptor on the child process by the parent process once the child process is spawned.

* * * * *